US 11,999,353 B2

(12) United States Patent
Sugae et al.

(10) Patent No.: US 11,999,353 B2
(45) Date of Patent: Jun. 4, 2024

(54) DETECTION DEVICE FOR DETECTING ROAD SURFACE INFORMATION RELATED TO MOVABLE BODY AND CONTROL THEREOF

(71) Applicant: AISIN CORPORATION, Kariya (JP)

(72) Inventors: Ippei Sugae, Kariya (JP); Kosuke Wakita, Kariya (JP)

(73) Assignee: AISIN CORPORATION, Kariya (JP)

(*) Notice: Subject to any disclaimer, the term of this patent is extended or adjusted under 35 U.S.C. 154(b) by 180 days.

(21) Appl. No.: 17/666,771

(22) Filed: Feb. 8, 2022

(65) Prior Publication Data
US 2022/0250625 A1 Aug. 11, 2022

(30) Foreign Application Priority Data
Feb. 9, 2021 (JP) ................................. 2021-019366

(51) Int. Cl.
B60W 40/06 (2012.01)

(52) U.S. Cl.
CPC ......... B60W 40/06 (2013.01); B60W 2420/54 (2013.01); B60W 2552/20 (2020.02); B60W 2554/4049 (2020.02)

(58) Field of Classification Search
CPC ............. B60W 40/06; B60W 2552/20; B60W 2554/4049; B60W 2420/54
USPC .......................................................... 701/1
See application file for complete search history.

(56) References Cited

U.S. PATENT DOCUMENTS

| | | | | |
|---|---|---|---|---|
| 6,169,940 | B1* | 1/2001 | Jitsukata | G05D 1/0261 701/23 |
| 11,487,005 | B2* | 11/2022 | Weissenmayer | G01S 7/539 |
| 11,770,677 | B1* | 9/2023 | Lesesky | H04W 4/023 455/456.1 |
| 2002/0189875 | A1* | 12/2002 | Asanuma | G01S 7/4026 180/169 |
| 2003/0086077 | A1* | 5/2003 | Kayano | B60Q 1/10 356/121 |
| 2003/0156585 | A1* | 8/2003 | Minami | G01C 9/00 370/392 |
| 2005/0188768 | A1* | 9/2005 | Hayashi | G10K 11/004 73/649 |
| 2006/0274299 | A1* | 12/2006 | Matsuura | G01S 17/931 356/28 |
| 2008/0021613 | A1* | 1/2008 | Hamaguchi | B60W 40/112 701/41 |

(Continued)

FOREIGN PATENT DOCUMENTS

JP 5104175 B2 * 12/2012
JP 2020-066246 A 4/2020

Primary Examiner — Richard A Goldman
(74) Attorney, Agent, or Firm — Sughrue Mion, PLLC

(57) ABSTRACT

An object detection device includes: a transmission and reception unit configured to transmit a transmission wave from a movable body moving on a road surface and receive a reflected wave from an object; and a generation unit configured to generate road surface information regarding a change in the road surface based on a difference between echo information indicating a change over time in an intensity of the reflected wave received by the transmission and reception unit and reference echo information indicating a predetermined change over time in an intensity of a reflected wave from the road surface.

4 Claims, 7 Drawing Sheets

(56) References Cited

U.S. PATENT DOCUMENTS

| | | | |
|---|---|---|---|
| 2010/0220550 A1* | 9/2010 | Akiyama | G01S 7/5273 |
| | | | 367/93 |
| 2012/0167663 A1* | 7/2012 | Groitzsch | G01S 7/4916 |
| | | | 73/9 |
| 2013/0082857 A1* | 4/2013 | Beer | G01S 13/885 |
| | | | 342/22 |
| 2014/0085127 A1* | 3/2014 | Kishigami | G08G 1/015 |
| | | | 342/108 |
| 2016/0318365 A1* | 11/2016 | Sivaraman | G01S 17/88 |
| 2019/0072666 A1* | 3/2019 | Duque Biarge | G01S 13/9023 |
| 2019/0113924 A1* | 4/2019 | Falconer | B60W 60/001 |
| 2019/0118821 A1* | 4/2019 | Hagenlocher | B60W 40/068 |
| 2019/0155285 A1* | 5/2019 | Wang | G05D 1/0255 |
| 2020/0062228 A1* | 2/2020 | Nakabayashi | B60Q 9/008 |
| 2020/0218211 A1* | 7/2020 | Dong | G05B 19/042 |
| 2020/0257292 A1* | 8/2020 | Zhao | B60W 30/143 |
| 2020/0271751 A1* | 8/2020 | Mayer | G01S 7/411 |
| 2021/0080568 A1* | 3/2021 | Brown | G01S 13/87 |
| 2022/0250625 A1* | 8/2022 | Sugae | B60W 40/06 |
| 2022/0390560 A1* | 12/2022 | Orellana | G01S 17/58 |
| 2023/0242149 A1* | 8/2023 | Alferdaous Alazem | |
| | | | G06V 20/56 |
| | | | 701/23 |
| 2023/0249510 A1* | 8/2023 | Kawasaki | B60G 17/01908 |
| | | | 701/37 |
| 2023/0286392 A1* | 9/2023 | Sawada | B60L 15/20 |
| | | | 701/22 |

\* cited by examiner

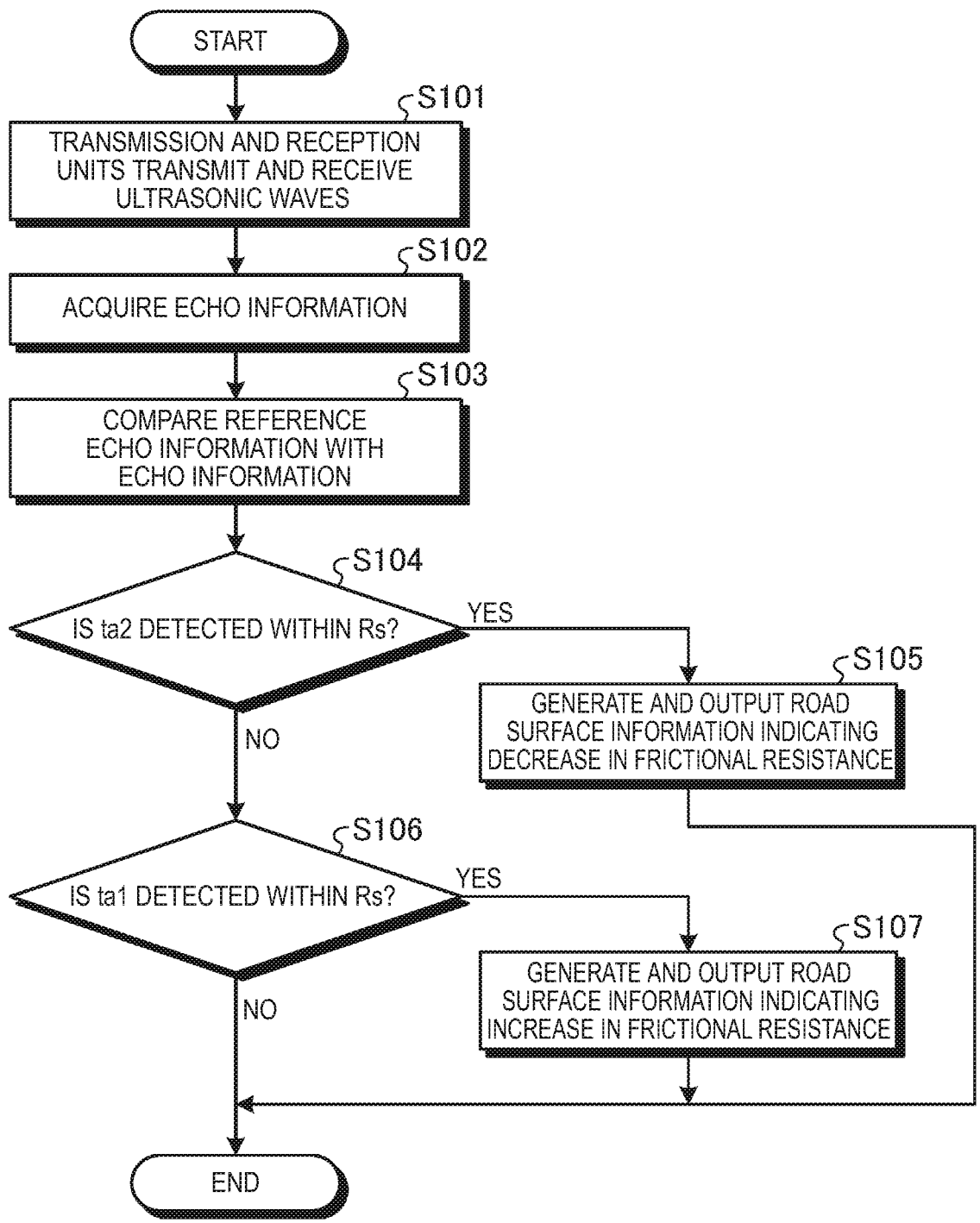

DETECTION DEVICE FOR DETECTING ROAD SURFACE INFORMATION RELATED TO MOVABLE BODY AND CONTROL THEREOF

CROSS REFERENCE TO RELATED APPLICATIONS

This application is based on and claims priority under 35 U.S.C. § 119 to Japanese Patent Application 2021-019366, filed on Feb. 9, 2021, the entire content of which is incorporated herein by reference.

TECHNICAL FIELD

This disclosure relates to an object detection device and a movable body control device.

BACKGROUND DISCUSSION

In a vehicle control system or the like, a device for detecting an object present around a vehicle by transmission and reception of ultrasonic waves is used. Further, a device for estimating a condition of a road surface on which a vehicle travels is used. For example, a device is disclosed that emits laser light or radio waves to a road surface and estimates a condition of the road surface based on an intensity of reflected light (JP 2020-66246A (Reference 1)).

A need thus exists for an object detection device and a movable body control device which are not susceptible to the drawback mentioned above.

SUMMARY

An object detection device as an example of this disclosure includes a transmission and reception unit configured to transmit a transmission wave from a movable body moving on a road surface and receive a reflected wave from an object; and a generation unit configured to generate road surface information regarding a change in the road surface based on a difference between echo information indicating a change over time in an intensity of the reflected wave received by the transmission and reception unit and reference echo information indicating a predetermined change over time in an intensity of a reflected wave from the road surface.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a flowchart showing an example of a process when object information is generated according to the embodiment.

DETAILED DESCRIPTION

Hereinafter, embodiments of this disclosure will be described with reference to the drawings. Configurations of the embodiments described below and operations and effects provided by the configurations are merely examples, and this disclosure is not limited to the following description.

Figure 1:
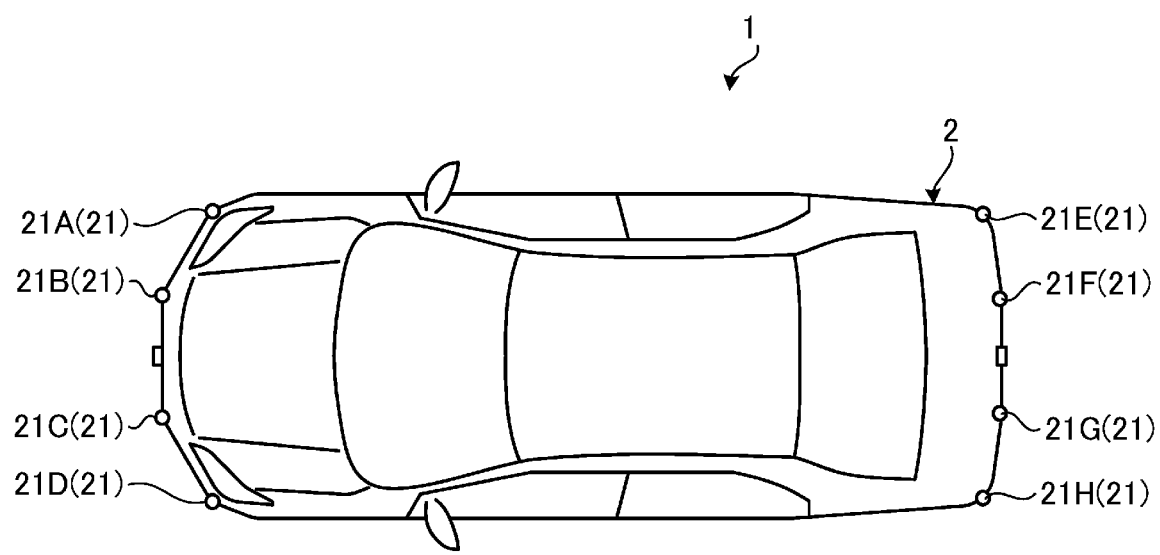
FIG. 1 is a top view showing an example of a configuration of a vehicle according to an embodiment.

FIG. 1 is a top view showing an example of a configuration of a vehicle 1 according to an embodiment. The vehicle 1 is an example of a movable body on which an object detection device according to the present embodiment is mounted. The object detection device according to the present embodiment is a device that detects an object existing around the vehicle 1 (other vehicles, a structure, a pedestrian, a road surface or the like) based on TOF, Doppler shift information or the like acquired by transmitting ultrasonic waves from the vehicle 1 and receiving reflected waves from the object.

The object detection device according to the present embodiment includes a plurality of transmission and reception units 21A to 21H (Hereinafter, referred to as a transmission and reception unit 21 when it is not necessary to distinguish among the transmission and reception units 21A to 21H). Each transmission and reception unit 21 is provided on a vehicle body 2 as an exterior of the vehicle 1, transmits ultrasonic waves (transmission waves) to the outside of the vehicle body 2, and receives reflected waves from an object existing outside the vehicle body 2. In the example shown in FIG. 1, four transmission and reception units 21A to 21D are disposed at a front end portion of the vehicle body 2, and four transmission and reception units 21E to 21H are disposed at a rear end portion of the vehicle body 2. The number of transmission and reception units 21 and positions where the transmission and reception units 21 are provided are not limited to the above example.

Figure 2:
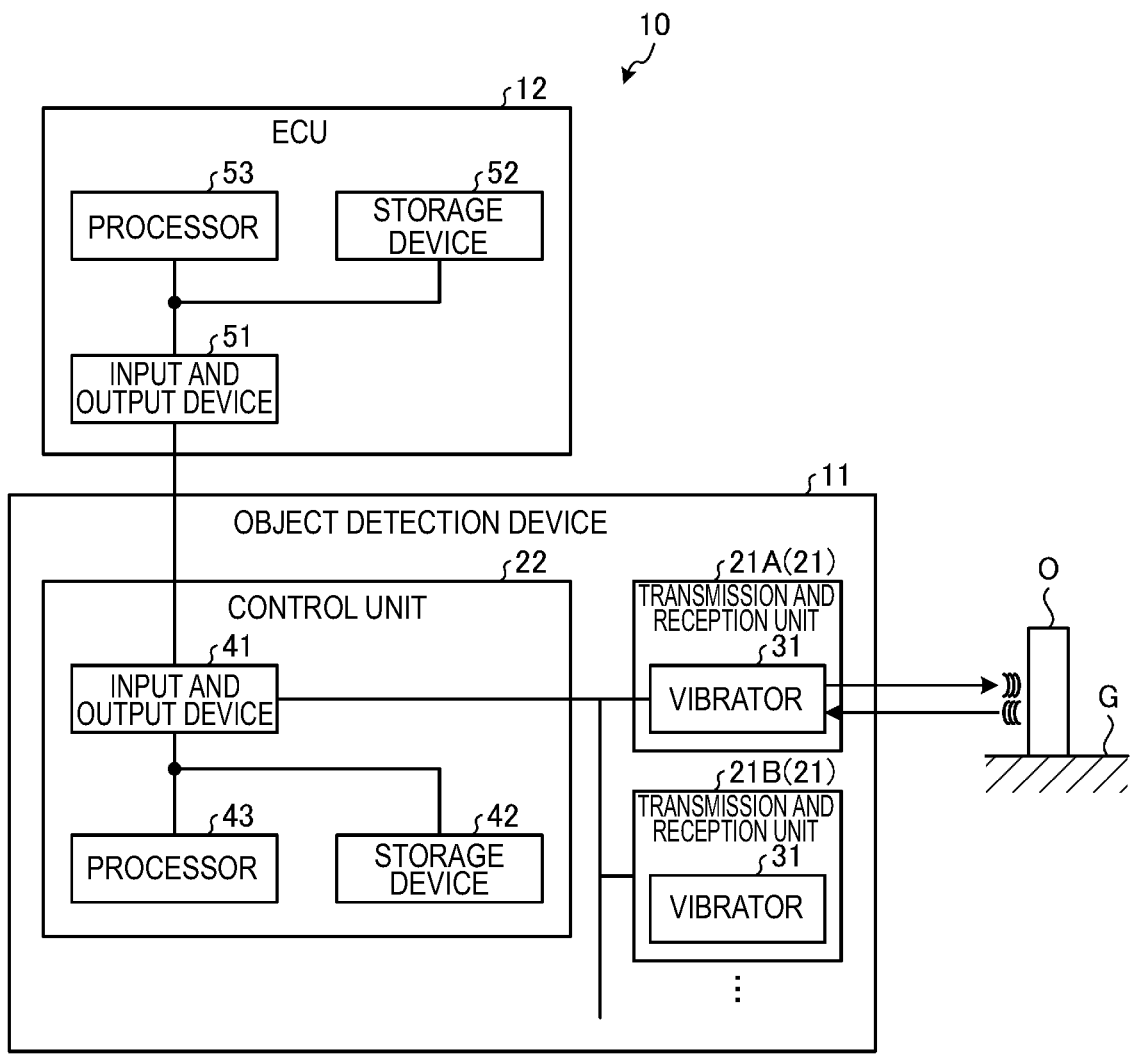
FIG. 2 is a block diagram showing an example of a configuration of a vehicle control device according to the embodiment.

FIG. 2 is a block diagram showing an example of a configuration of a vehicle control device 10 according to the embodiment. The vehicle control device 10 (an example of a movable body control device) includes an object detection device 11 and an ECU 12. The vehicle control device 10 performs a process for controlling the vehicle 1 based on information output from the object detection device 11.

The object detection device 11 includes the plurality of transmission and reception units 21 and a control unit 22. Each of the transmission and reception units 21 includes such as an amplifier, and a vibrator 31 configured using a piezoelectric element or the like, and achieves the transmission and reception of ultrasonic waves by vibration of the vibrator 31. Specifically, each of the transmission and reception units 21 transmits, as the transmission waves, ultrasonic waves generated in response to the vibration of the vibrator 31, and detects vibration of the vibrator 31 caused by the reflected waves reflected by the object. The object includes a target O a contact with which the vehicle 1 needs to avoid and a road surface G on which the vehicle 1 travels. The vibration of the vibrator 31 is converted into an electric signal, and echo information indicating a change over time in an intensity (an amplitude) of the reflected waves from the object can be acquired based on the electrical signal. The TOF or the like corresponding to a distance from the transmission and reception unit 21 (the vehicle body 2) to the object can be acquired based on the echo information.

The echo information may be generated based on date acquired by one of the transmission and reception units 21, and may be generated based on a plurality of pieces of data acquired respectively by the plurality of transmission and reception units 21. For example, the echo information regarding an object existing in front of the vehicle body 2 may be generated based on two or more pieces of data (for example, an average value) acquired by two or more of the four transmission and reception units 21A to 21D disposed in front of the vehicle body 2 (see FIG. 1). Similarly, the echo information regarding an object existing behind the vehicle body 2 may be generated based on two or more pieces of data acquired by two or more of the four transmission and reception units 21E to 21H disposed behind the vehicle body 2 (see FIG. 1).

In the example shown in FIG. 2, a configuration in which both the transmission of the transmission waves and the reception of the reflected waves are implemented by using the single vibrator 31 is shown, whereas the configuration of the transmission and reception unit 21 is not limited thereto. For example, the configuration may be a configuration in which a transmission side vibrator and a reception side vibrator are separated, such as a configuration in which a vibrator for transmitting the transmission waves and a vibrator for receiving the reflected waves are separately provided.

The control unit 22 includes an input and output device 41, a storage device 42, and a processor 43. The input and output device 41 is an interface device for implementing transmission and reception of information between the control unit 22 and an external mechanism (the transmission and reception units 21, the ECU 12 or the like). The storage device 42 includes a main memory device such as a read only memory (ROM) or a random access memory (RAM), and an auxiliary storage device such as a hard disk drive (HDD) or a solid state drive (SSD). The processor 43 is an integrated circuit that executes various processes for achieving a function of the control unit 22, and includes, for example, a central processing unit (CPU) that operates according to a program, an application specific integrated circuit (ASIC) designed for a specific application, and the like. The processor 43 executes various arithmetic processes and control processes by reading and executing programs stored in the storage device 42.

The ECU 12 is a unit that executes various processes for controlling the vehicle 1 based on various kinds of information acquired from the object detection device 11 or the like. The ECU 12 includes an input and output device 51, a storage device 52, and a processor 53. The input and output device 51 is an interface device for implementing transmission and reception of information between the ECU 12 and an external mechanism (the object detection device 11, a drive mechanism, a brake mechanism, a steering mechanism, a transmission mechanism, an in-vehicle display, a speaker or the like). The storage device 52 includes a main memory device such as a ROM or a RAM, and an auxiliary storage device such as an HDD or an SSD. The processor 53 is an integrated circuit that executes various processes for achieving a function of the ECU 12, and includes, for example, a CPU and an ASIC. The processor 53 executes various arithmetic processes and control processes by reading and executing programs stored in the storage device 52.

Figure 3:
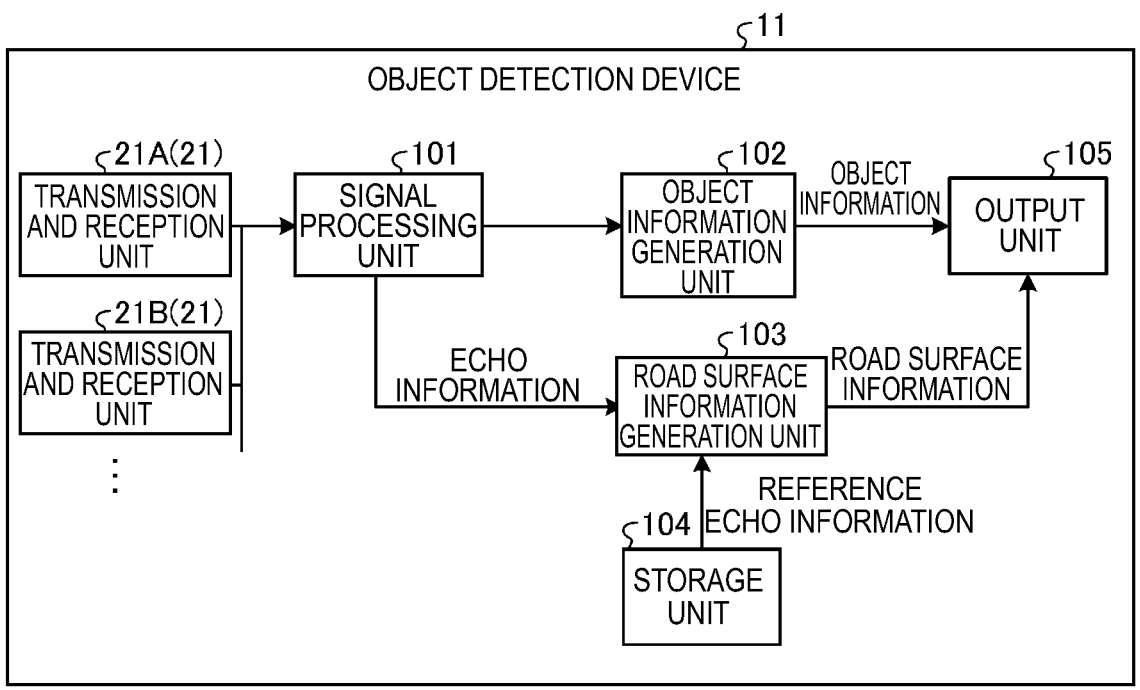
FIG. 3 is a block diagram showing an example of a function configuration of an object detection device according to the embodiment.

FIG. 3 is a block diagram showing an example of a function configuration of the object detection device 11 according to the embodiment. The object detection device 11 according to the present embodiment includes a signal processing unit 101, an object information generation unit 102, a road surface information generation unit 103 (a generation unit), a storage unit 104 and an output unit 105. These functional components 101 to 105 are implemented by cooperation of hardware components of the object detection device 11 shown in FIG. 2 and software components such as firmware and programs.

The signal processing unit 101 processes data acquired by the transmission and reception units 21 and generates various kinds of information. The signal processing unit 101 performs, for example, an amplification process, a filter process, an envelope process or the like on the electric signal corresponding to the vibration of the vibrator 31, and generates the echo information indicating a change over time in the intensities (the amplitudes) of the reflected waves which are the transmission waves transmitted by the transmission and reception units 21 and reflected by the object. The TOF corresponding to the object existing around the vehicle 1 can be detected, and a distance from the vehicle body 2 to the object can be calculated based on the echo information.

The object information generation unit 102 generates object information regarding a target existing around the vehicle 1 (for example, other vehicles, a structure, a pedestrian or the like) based on the information generated by the signal processing unit 101. The object information may include, for example, the distance from the vehicle body 2 to the target, a relative velocity of the target, a type of the target or the like.

The road surface information generation unit 103 generates road surface information regarding a change in the road surface G based on a difference between the echo information which is generated by the signal processing unit 101 and indicates the change over time in the intensity of the reflected waves and reference echo information indicating a predetermined change over time in the intensity of the reflected waves from the road surface G. A process performed by the road surface information generation unit 103 will be described in detail later.

The storage unit 104 stores the reference echo information.

The output unit 105 outputs the object information generated by the object information generation unit 102 and the road surface information generated by the road surface information generation unit 103. The object information and the road surface information are output to, for example, the ECU 12 and are used for controlling the vehicle 1 (for example, an acceleration and deceleration control, a steering control, a warning to occupants, or the like).

Figure 4:
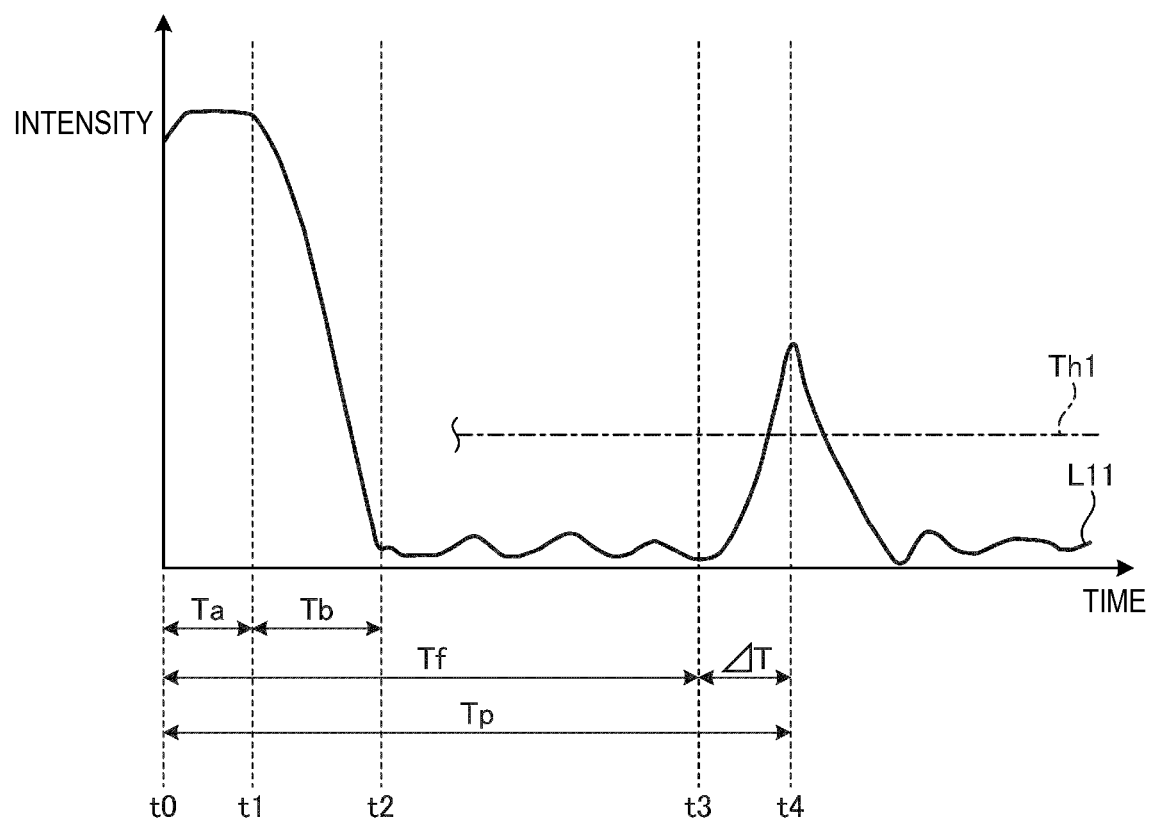
FIG. 4 is a diagram showing an example of echo information when an object is detected by using TOF in the embodiment.

FIG. 4 is a diagram showing an example of the echo information when an object is detected by using the TOF in the embodiment. FIG. 4 illustrates an envelope curve L11 (an example of the echo information) showing the change over time in the intensity of ultrasonic waves transmitted and received by the transmission and reception unit 21. In the graph shown in FIG. 4, a horizontal axis corresponds to time (the TOF), and a vertical axis corresponds to the intensity of the ultrasonic waves transmitted and received by the transmission and reception unit 21.

The envelope curve L11 shows the change over time in the intensity indicating the magnitude of the vibration of the vibrator 31. It can be read from this envelope curve L11 that when the vibrator 31 is driven to vibrate only for a time Ta from a timing t0, the transmission of the transmission waves is completed at a timing t1, and then the vibration of the vibrator 31 continues due to inertia while being attenuated during a time Tb up to a timing t2. Therefore, in the graph shown in FIG. 4, the time Tb corresponds to a so-called reverberation time.

The envelope curve L11 has a peak in which the magnitude of the vibration of the vibrator 31 is equal to or higher than a predetermined target threshold value Th1 at a timing t4 at which a time Tp elapses from the timing t0 when the transmission of the transmission waves is started. The target threshold value Th1 is a value which is preset to identify whether the vibration of the vibrator 31 is caused by the reception of the reflected waves from the target O (other vehicles, a structure, a pedestrian or the like), or whether the vibration is caused by the reception of the reflected waves from an object (for example, the road surface G) other than the target O. Here, although the target threshold value Th1 is shown as a constant value, the target threshold value Th1 may be a variable value that changes depending on an elapse of time, situations or the like. Therefore, vibration having a peak equal to or higher than the target threshold value Th1 can be regarded as being caused by the reception of the reflected waves from the target O.

In the envelope curve L11, the vibration of the vibrator 31 is attenuated after the timing t4. Therefore, the timing t4 corresponds to a timing at which the reception of the reflected waves from the target O is completed, that is, a timing at which the transmission waves last transmitted at the timing t1 are returned as the reflected waves.

Further, in the envelope curve L11, a timing t3 as a start point of the peak at the timing t4 corresponds to a timing at which the reception of the reflected waves from the target O starts, that is, a timing at which the transmission waves first transmitted at the timing t0 are returned as the reflected waves. Therefore, a time ΔT between the timing t3 and the timing t4 is equal to the time Ta serving as a transmission time of the transmission waves.

Based on the above, in order to obtain the distance to the target O by using the TOF, it is necessary to obtain a time Tf between the timing t0 at which the transmission waves start to be transmitted and the timing t3 at which the reflected waves start to be received. The time Tf can be obtained by subtracting the time ΔT equal to the time Ta serving as the transmission time of the transmission waves from the time Tp as a difference between the timing t0 and the timing t4 at which the intensity of the reflected waves exceeds the target threshold value Th1 and reaches the peak.

The timing t0 at which the transmission waves start to be transmitted can be easily specified as a timing at which the object detection device 11 starts to operate, and the time Ta serving as the transmission time of the transmission waves is predetermined by a setting or the like. Therefore, the distance to the target O can be obtained by specifying the timing t4 at which the intensity of the reflected waves reaches the peak in which the intensity is equal to or higher than the target threshold value Th1. The object information generation unit 102 generates the object information regarding the target O by, for example, the above method.

Hereinafter, a process performed by the road surface information generation unit 103 according to the present embodiment will be described. The road surface information generation unit 103 generates the road surface information regarding the change in the road surface G based on the difference between the echo information indicating the change over time in the intensity of the reflected waves (for example, the envelope curve described above) and the reference echo information indicating the predetermined change over time in the intensity of the reflected waves from the road surface G.

Figure 5:
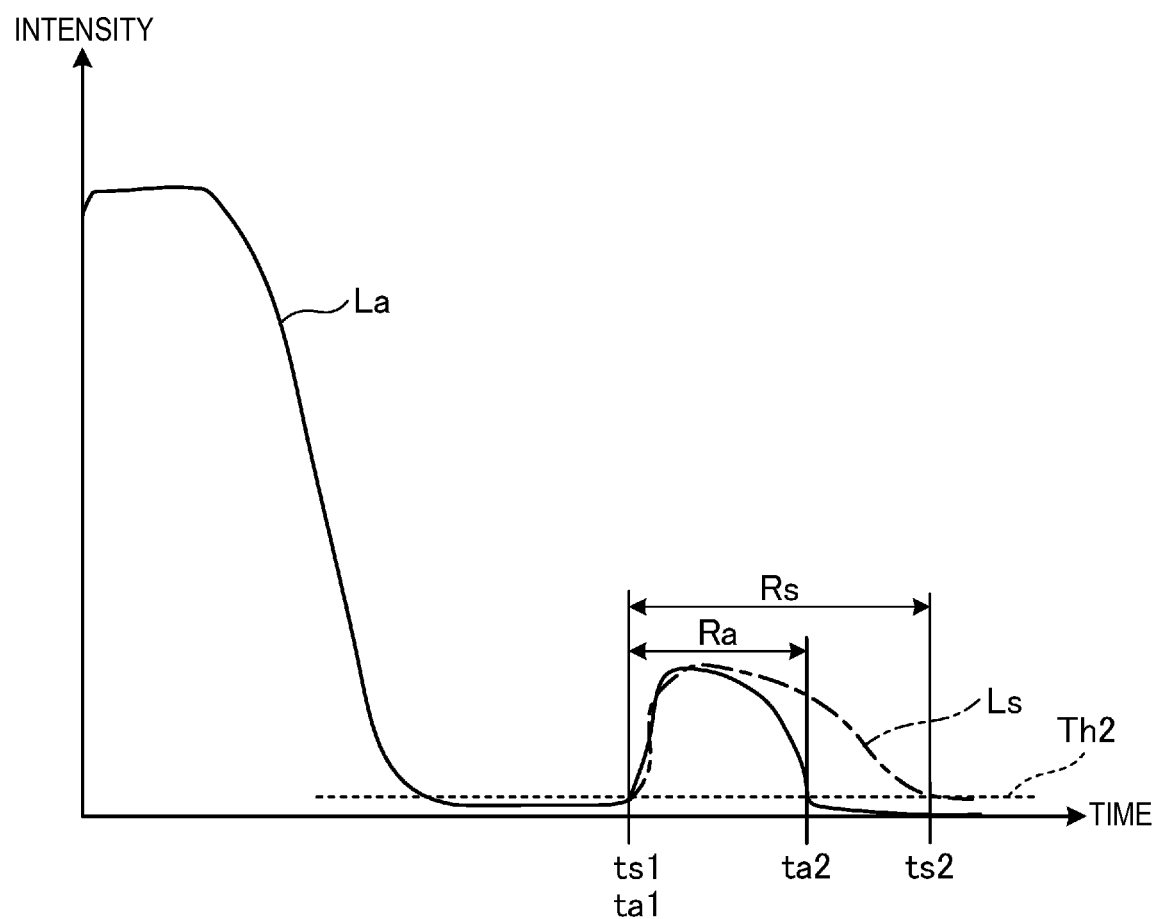
FIG. 5 is a diagram showing an example of a difference between an envelope curve and a reference envelope curve when a frictional resistance of the road surface changes so as to reduce in the embodiment.

FIG. 5 is a diagram showing an example of a difference between an envelope curve La and a reference envelope curve Ls when the frictional resistance of the road surface G changes so as to reduce in the embodiment. The envelope curve La is an example of the echo information, and the reference envelope curve Ls is an example of the reference echo information.

The reference envelope curve Ls includes a reference road surface detection period Rs during which the intensity of the reflected waves from the road surface G is equal to or higher than a predetermined road surface threshold value Th2. The reference road surface detection period Rs is a period between a first reference time point ts1 at which the intensity of the reflected waves becomes equal to or higher than the road surface threshold value Th2 from a state in which the intensity is lower than the road surface threshold value Th2 and a second reference time point ts2 at which the intensity becomes lower than the road surface threshold value Th2 from the state in which the intensity is equal to or higher than the road surface threshold value Th2. The road surface threshold value Th2 is a value that is preset based on the reflected waves from a road surface in a reference state (for example, asphalt in a dry state). The road surface threshold value Th2 may be, for example, a value for removing noise caused by a structure of the transmission and reception unit 21 (the vibrator 31 or the like) or the like. The road surface threshold value Th2 is usually a value lower than the target threshold value Th1 for detecting the target O as described above. The road surface threshold value Th2 may be a constant value, or may be a variable value.

The envelope curve La shown in FIG. 5 includes a road surface detection period Ra between a first time point ta1 at which the intensity of the reflected waves becomes equal to or higher than the road surface threshold value Th2 from a state in which the intensity is lower than the road surface threshold value Th2 and a second time point ta2 at which the intensity becomes lower than the road surface threshold value Th2 from the state in which the intensity is equal to or higher than the road surface threshold value Th2. The road surface detection period Ra is shorter than the reference road surface detection period Rs. Such a difference between the road surface detection period Ra and the reference road surface detection period Rs is generated due to a difference between a state of the road surface G corresponding to the envelope curve La and a state of a reference road surface corresponding to the reference envelope curve Ls.

The second time point ta2 in FIG. 5 is detected at a time point corresponding to a distance shorter than that of the second reference time point ts2. That is, the intensity of the reflected waves from the road surface G becomes lower than the road surface threshold value Th2 at a position closer than a reference position. Such a phenomenon occurs when the frictional resistance of the road surface G changes so as to decrease (when the frictional resistance changes to be a value lower than a reference value from a state in which the frictional resistance is equal to or higher than the reference value).

Reflection characteristics of the ultrasonic waves change depending on a material of the road surface, a water content, a temperature or the like, and in many cases, reflection efficiency of the ultrasonic waves decreases as a frictional resistance of a reflective target (the road surface) decreases. Therefore, as described above, the decrease in the frictional resistance of the road surface G in a traveling direction of the vehicle 1 can be detected in advance by monitoring whether the second time point ta2, at which the intensity of the reflected waves becomes lower than the road surface threshold value Th2 from the state in which the intensity is equal to or higher than the road surface threshold value Th2, is detected at a time point corresponding to a distance shorter than that of the second reference time point ts2, in other words, whether the second time point ta2 is detected in the reference road surface detection period Rs. Accordingly, it is possible to generate road surface information indicating that the frictional resistance of the road surface G reduces, and use the road surface information to control the vehicle 1.

Figure 6:
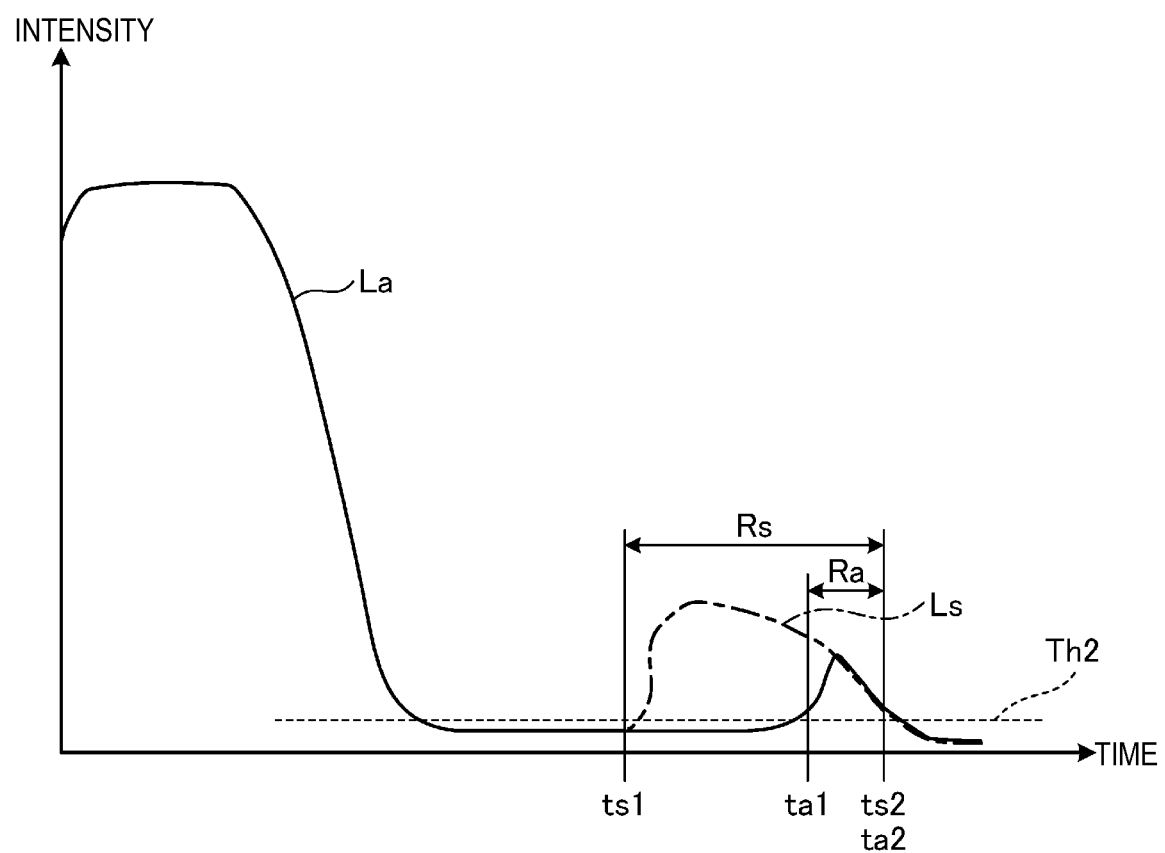
FIG. 6 is a diagram showing an example of a difference between the echo information and reference echo information when the frictional resistance of the road surface changes so as to increase in the embodiment.

FIG. 6 is a diagram showing an example of a difference between the echo information La and the reference echo information Ls when the frictional resistance of the road surface changes so as to increase in the embodiment. The first time point ta1 in FIG. 6 is detected at a time point corresponding to a distance longer than that of the first reference time point ts1. That is, the intensity of the reflected waves from the road surface G becomes equal to or higher than the road surface threshold value Th2 at a position farther than the reference position. Such a phenomenon occurs when the frictional resistance of the road surface G changes so as to increase (when the frictional resistance changes so as to be equal to or higher than the reference value from a state in which the frictional resistance is lower than the reference value).

In this way, the increase in the frictional resistance of the road surface G in the traveling direction of the vehicle 1 can be detected in advance by monitoring whether the first time point ta1, at which the intensity of the reflected waves becomes equal to or higher than the road surface threshold value Th2 from the state in which the intensity is lower than the road surface threshold value Th2, is detected at a time point corresponding to a distance longer than that of the first reference time point ts1, in other words, whether the first time point ta1 is detected in the reference road surface detection period Rs. Accordingly, it is possible to generate road surface information indicating that the frictional resistance of the road surface G increases, and use the road surface information to control the vehicle 1.

FIG. 7 is a flowchart showing an example of a process when the object information is generated according to the embodiment. When the transmission and reception units 21 transmit and receive ultrasonic waves (S101), the signal processing unit 101 acquires the echo information La based on an average value of a plurality of pieces of data (intensity values of the reflected waves or the like) acquired by the plurality of transmission and reception units 21 (S102).

The road surface information generation unit 103 compares the reference echo information Ls stored in the storage unit 104 with the echo information La acquired by the signal processing unit 101 (S103), and determines whether the second time point ta2 is detected within the reference road surface detection period Rs (S104). When the second time point ta2 is detected within the reference road surface detection period Rs (S104: Yes), the road surface information generation unit 103 generates road surface information indicating the decrease in the frictional resistance of the road surface, the output unit 105 outputs the road surface information to the ECU 12 or the like (S105), and this routine ends.

When the second time point ta2 is not detected within the reference road surface detection period Rs (S104: No), the road surface information generation unit 103 determines whether the first time point ta1 is detected within the reference road surface detection period Rs (S106). When the first time point ta1 is detected within the reference road surface detection period Rs (S106: Yes), the road surface information generation unit 103 generates road surface information indicating the increase in the frictional resistance of the road surface, the output unit 105 outputs the road surface information to the ECU 12 or the like (S107), and this routine ends. When the first time point ta1 is not detected within the reference road surface detection period Rs (S106: No), this routine ends.

According to the above embodiment, it is possible to detect the state of the road surface (the change in the frictional resistance or the like) by using ultrasonic waves.

A program for causing a computer (for example, the processor 43 of the control unit 22, the processor 53 of the ECU 12, or the like) to execute a process for achieving the various functions in the above embodiment can be provided by being recorded as an installable or executable format file in a computer-readable recording medium such as a CD (compact disc)-ROM, a flexible disc (FD), a CD-R (Recordable), or a digital versatile disk (DVD). Further, the program may be provided or distributed via a network such as the Internet.

An object detection device as an example of this disclosure includes a transmission and reception unit configured to transmit a transmission wave from a movable body moving on a road surface and receive a reflected wave from an object; and a generation unit configured to generate road surface information regarding a change in the road surface based on a difference between echo information indicating a change over time in an intensity of the reflected wave received by the transmission and reception unit and reference echo information indicating a predetermined change over time in an intensity of a reflected wave from the road surface.

According to the above configuration, a condition of the road surface can be detected by using a change in reflection characteristics of ultrasonic waves accompanying the change in the road surface.

The generation unit may generate the road surface information based on a difference between a reference road surface detection period during which the intensity is equal to or higher than a predetermined road surface threshold value in the reference echo information and a road surface detection period during which the intensity is equal to or higher than the road surface threshold value in the echo information.

Accordingly, the change in the road surface can be accurately detected.

The generation unit may generate the road surface information indicating that a frictional resistance of the road surface reduces when a time point at which the intensity in the echo information becomes lower than the road surface threshold value from a state in which the intensity is equal to or higher than the road surface threshold value is detected during the reference road surface detection period.

Accordingly, a decrease in the frictional resistance of the road surface can be detected by using a phenomenon that the intensity of the reflected wave decreases as the frictional resistance of the road surface decreases.

The generation unit may also generate the road surface information indicating that the frictional resistance of the road surface increases when a time point at which the intensity in the echo information becomes equal to or higher than the road surface threshold value from a state in which the intensity is lower than the road surface threshold value is detected during the reference road surface detection period.

Accordingly, an increase in the frictional resistance of the road surface can be detected by using a phenomenon that the intensity of the reflected wave increases as the frictional resistance of the road surface increases.

The echo information may be generated based on an average value of the intensities acquired by a plurality of the transmission and reception units.

Accordingly, the accuracy of the echo information can be improved.

A movable body control device as an example of this disclosure includes the above object detection device, and a control device configured to perform a process for controlling, based on the road surface information regarding the change in the road surface output from the object detection device, a movable body moving on the road surface.

According to the above configuration, the movable body can be controlled based on the road surface information generated by the object detection device.

Although the embodiment of this disclosure has been described above, these embodiments described above and modifications thereof have been presented by way of example only, and are not intended to limit the scope of the inventions. Indeed, these novel embodiments and modifications thereof described herein may be embodied in a variety of forms; furthermore, various omissions, substitutions and changes in the form of these embodiments and modifications thereof described herein may be made without departing from the spirit of the inventions. These embodiments and modifications thereof described herein are included in the scope and gist of this disclosure, and are also included in the inventions described in the claims and their equivalents.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
   a transmission and reception unit configured to transmit a transmission wave from a movable body moving on a road surface and receive a reflected wave from a road surface; and
   a generation unit configured to generate road surface information regarding a change in the road surface based on a difference between echo information indicating a change over time in an intensity of the reflected wave reflected from the road surface and received by the transmission and reception unit and predetermined reference echo information indicating a predetermined change over time in an intensity of a reflected wave from a predetermined road surface,
   wherein the generation unit generates the road surface information based on a difference between a predetermined reference road surface detection period of the predetermined reference echo information which is a reference time period where the intensity is equal to or higher than a predetermined road surface threshold value in the predetermined reference echo information, and a road surface detection period which is a time period during which the intensity of the reflected wave is equal to or higher than the predetermined road surface threshold value in the echo information.

2. The object detection device according to claim 1, wherein
   the generation unit generates the road surface information indicating that a frictional resistance of the road surface is less than a predetermined friction of the predetermined road surface when a time point at which the intensity in the echo information becomes lower than the predetermined road surface threshold value from a state in which the intensity is equal to or higher than the predetermined road surface threshold value is detected during the road surface detection period as compared to a time point at which the intensity in the predetermined echo information becomes lower than the predetermined road surface threshold value from a state in which the intensity is equal to or higher than the predetermined road surface threshold value in the predetermined reference road surface detection period.

3. The object detection device according to claim 1, wherein
   the generation unit generates the road surface information indicating that a frictional resistance of the road surface is greater than a predetermined friction of the predetermined road surface when a time point at which the intensity in the echo information becomes equal to or higher than the predetermined road surface threshold value from a state in which the intensity is lower than the road surface threshold value is detected during the road surface detection period as compared to a time point at which the intensity in the predetermined echo information becomes higher than the predetermined road surface threshold value from a state in which the intensity is equal to or higher than the predetermined road surface threshold value in the predetermined reference road surface detection period.

4. The object detection device according to claim 1, wherein
   the echo information is generated based on an average value of the intensities acquired by a plurality of the transmission and reception units.

* * * * *